Patented Nov. 2, 1937

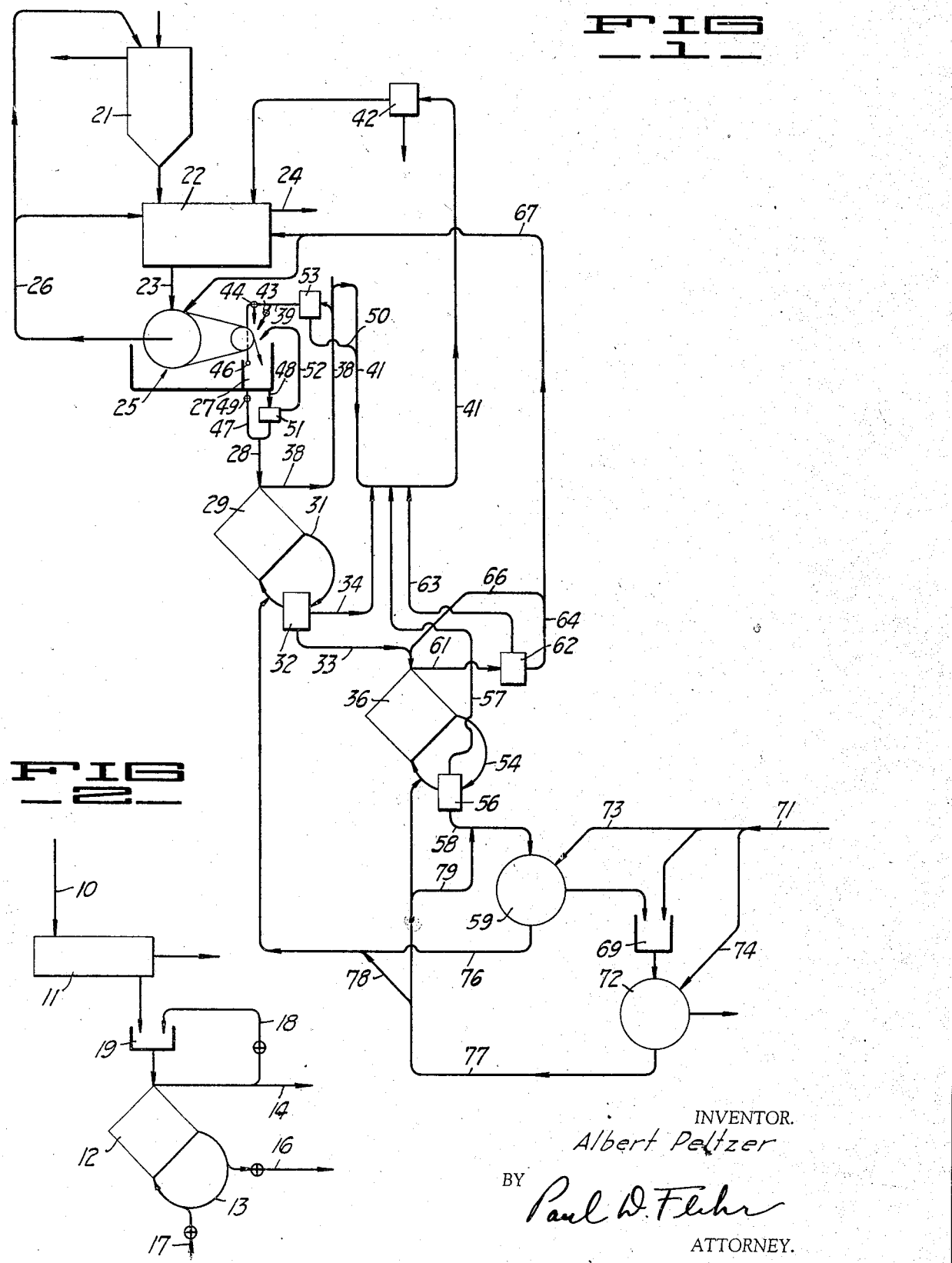

2,097,531

UNITED STATES PATENT OFFICE 2,097,531

PROCESS APPLICABLE TO STARCH MANUFACTURE

Albert Peltzer, Palo Alto, Calif., assignor to Merco Centrifugal Separator Co. Ltd., San Francisco, Calif., a corporation of California Application June 20, 1934, Serial No. 731,415

9 Claims. (Cl. 127—69)

This invention relates generally to the art of effecting separating operations upon feed materials containing solid components, and applies more particularly to wet starch processes wherein a separation is effected between starch and gluten.

In general, it is an object of the invention to provide a novel method or process for effecting removal of a solid component, such as gluten, from starch-bearing substances or like feed materials, by the use of a minimum amount of water or carrier liquid.

More specifically as applied to the manufacture of starch, it is an object of the invention to make possible delivery of thickened gluten directly from the step of effecting primary separation between starch and gluten. The starch system disclosed herein is characterized by the fact that conventional gluten settlers or thickeners are omitted, which is made possible by the high gravity gluten obtained from the primary separation.

Further objects of the invention as applied to the manufacture of starch, are to avoid fouling by bacteriological action, to effect a saving in the amount of fresh water employed, to avoid the necessity of evaporating excessive amounts of water, and to enable production of a starch of high quality and purity.

Further objects of the invention will appear from the following description in which the preferred embodiments of the invention have been set forth in detail in conjunction with the accompanying drawing.

Referring to the drawing:

Fig. 1 is a flow sheet illustrating a process for the manufacture of corn starch.

Fig. 2 is a simplified flow sheet showing certain steps incorporated in the process of Fig. 1.

Before describing the starch manufacturing process represented by Fig. 1, I shall first outline the simplified process of Fig. 2. It will be presumed that mill starch is being treated, in which the starch and the gluten are solid components of different classifying characteristics, suspended in water as a carrier liquid. The supply of mill starch, represented by line 10, is first dewatered to a substantial degree, as by passing it through a suitable filter 11 or like dewatering apparatus. The dewatered filter cake then serves to make up a feed to a step of effecting separation between the starch and the gluten. To carry out this primary separation, I have secured good results by the use of a continuously operating centrifuge 12. More particularly, a centrifuge of the type disclosed in United States Letters Patent No. 1,923,454 and No. 1,945,786, in which there is a continuous flushing out of heavier solids from the rotor, has been found desirable. Thus, the centrifuge 12 is shown provided with a flow circuit 13 for continuously returning a part of the starch underflow back into the centrifuge rotor, while lines 14 and 16 represent the gluten overflow and starch take-off, respectively. Line 17 represents introduction of wash water into the return circuit, to carry out the separated starch in the underflow.

Instead of pulping the filter cake with fresh water or an additional source of liquor, to afford sufficient fluidity for feeding the centrifuge, I employ a part of the gluten overflow. Thus, line 18 represents diversion of a part of the gluten overflow to the mixing container 19, where it is pulped or intermixed with the filter cake, and from which the fluid mixture is supplied to the centrifuge 12.

Pulping of the dewatered solids by the use of part of the gluten overflow accomplishes several desirable objects aside from the standpoint of water economy. Mainly, it serves to thicken the overflow to a marked degree, which, as will be presently explained, is desirable in that it facilitates further treatment of this component. Prior methods of effecting primary separation between solid components produce a dilute overflow which, in the case of gluten water, necessitates additional thickening operations before further treatment of the same. I have also found that, contrary to what might be expected, the efficiency of separation is not seriously affected even though the percentage of gluten fed to the machine is necessarily increased to a material degree.

It is evident from the above that I have provided a simple process applicable to materials containing mixed solid components with an insufficient amount of water or carrier liquid to be supplied directly to a centrifuge or like separating apparatus (e. g. filter cake), or to suspensions where dewatering or removal of carrier liquid can be employed to produce a dewatered mixture. In either instance, sufficient fluidity is imparted to the mixture for supplying the same to the centrifuge, by pulping the same with a part of the overflow, the overflow containing the lighter separated solid components. Likewise, the heavier solid components are removed from the centrifuge in a liquid other than that contained in the mixture being pulped; therefore, with materials such as dewatered mill starch filter cake, the liquid in the overflow consists mainly of moisture in the dewatered mass, which is sufficient to impart fluidity to the gluten in the absence of starch particles.

The starch manufacturing process of Fig. 1 incorporates the substance of the process outlined above and can be described as follows:—A suitable starch-bearing material, such as Indian corn, is treated in the steeps 21 and then supplied to the milling system 22. In the milling system the corn is disintegrated, and certain ingredients, namely, the germs and the fibrous material, are separated to leave a mill starch consisting largely of starch and gluten. The mill starch is shown being removed from the milling system by line 23, while the other separated components are indicated as being removed by line 24. Instead of supplying the mill starch to conventional tables for the removal of starch from gluten, the mill starch is supplied to a suitable continuous filter 25. Line 26 indicates removal of filtrate, a part of which is shown being returned to the steeps 21, and another part to the milling system 22 where it serves as a wash liquor to aid in certain of the milling operations. The filter cake from the continuous filter 25 is shown being delivered into the mixing receptacle 27, where it is repulped and supplied by line 28 to the centrifuge 29. The underflow return circuit 31 of the centrifuge 29 is shown serially connected with a flotation cell 32 in the manner described in co-pending application Serial No. 682,909. Line 33 represents the starch take-off from the flotation operation, while line 34 represents the draw-off of gluten. The starch flow 33 is shown being introduced into a second centrifuge 36, for washing and further purification.

The gluten overflow 38 from the centrifuge 29 is divided into two parts, one part represented by line 39 which is introduced into container 27 for repulping with the filter cake, and the other part represented by line 41 which is delivered to the gluten presses or like dewatering means 42. Discharge of gluten water to the container 27 is shown controlled by a hand-adjusted valve 43, and by valve 44 which is controlled automatically by the float 46. In order that the feed through line 28 to the centrifuge 29 may be at substantially constant gravity, flow from container 27 to line 28 is preferably through two paths 47 and 48. The flow through path 47 is controlled by the hand-adjusted valve 49, while the flow through path 48 is controlled by a continuously-operating specific gravity controlling device 51. A device of this character has been disclosed in Harrison S. Coe, Patent No. 1,908,691.

When the specific gravity of the repulped material is within desired gravity limits, a certain amount of the material received by the device 51 is continuously returned to container 27 by way of line 52. When the specific gravity of the material tends to fall, an increased amount is returned by line 52, thus causing a rise of the level in container 27 and movement of float 46 to reduce the rate of flow of gluten water through valve 44. Such compensating adjustments cause the specific gravity of the repulped material to rise again to the desired value. Conversely, a similar adjustment likewise takes place in the event the specific gravity of the repulped material rises above the desired value. With respect to the gluten overflow being delivered to container 27, it may be passed through a flotation cell 53 in order to float off thickened gluten to be supplied to the presses 42 by way of lines 41 and 50. Line 34, representing the gluten draw-off from flotation cell 32, is also shown merged with line 41 for delivery of gluten to the presses.

With respect to the second centrifuge 36, the starch return circuit 54 is serially connected with a flotation cell 56. The gluten draw-off 57 from the cell is merged with line 41, for delivery to presses 42, while the starch draw-off 58 is delivered to the filter 59. The gluten overflow 61 from centrifuge 36 is shown being delivered to a flotation cell 62, and the gluten draw-off 63 from this cell is likewise merged with the gluten line 41. The liquid draw-off 64 from cell 62 is divided into two parts, one part flowing through line 66 to be returned with the feed to centrifuge 36, and the other part flowing through line 67 to serve as wash liquor in the milling system 22 and as a spray wash for the filter 25.

To secure further washing of the starch filter cake removed in filter 59, this cake is shown delivered to container 69 where it is repulped with fresh water from the fresh water line 71. This repulped material is then supplied to a second filter 72, from which the final purified starch cake is removed. Fresh water is also shown entering the process through filters 59 and 72, as indicated by lines 73 and 74.

The filtrate from filters 59 and 72, represented by lines 76 and 77, can serve as wash liquor in preceding steps of the process. Thus, the filtrate removed through line 76 serves as wash liquor in the first centrifuge 29, while the less contaminated water from line 77 serves as wash liquor for centrifuge 36. To secure a proper balance between the two centrifuges, line 78 indicates the diversion of a certain amount of the filtrate from line 77 to line 78. Likewise, another part of the filtrate from line 77 is shown diverted through line 79, for introduction with the feed to filters 59.

The process described above with respect to Fig. 1 can now be reviewed in entirety. After treatment of the steeped corn in the milling system, the mill starch is delivered to the continuous filter 25, to effect a dewatering operation. Filtrate from this filtering operation can be returned to the steeps as indicated by line 26, and if desired a portion can be returned to the milling system 22. The filtered material or filter cake is continuously repulped with gluten water, and this repulped material is then supplied through line 28 to the first centrifuge 29. In a typical instance, this repulped feed may be at a gravity of about 12 Baumé. The rate of introduction of wash liquor into the first centrifuge 29 by way of line 76 is preferably adjusted so that substantially all of the water of the same passes out with the starch underflow, and so that substantially all of the water in the underflow originates from the wash. It is also possible so to operate centrifuge 29, with respect to the rate of introduction of wash liquor that a portion of the wash liquor flows countercurrently through the separating zone, to be discharged together with the overflow 38, in which event the overflow will be somewhat diluted. Likewise, by reducing the amount of wash liquor entering the centrifuge rotor, it is possible to provide a certain downflow of gluten through the separating zone, to be discharged together with the starch underflow, in which event the gluten overflow 38 will tend to thicken because of loss of moisture to the underflow. The last-mentioned procedure may be desirable in some instances in order to secure a highly thickened gluten overflow, although it may require additional centrifuging operations to purify the starch. Generally, the first-mentioned procedure will prove satisfactory. In any event, a gluten overflow can be obtained which is of sufficiently high gravity that it can be delivered directly to the gluten presses 42, without further dewatering by gravity separation.

The separation effected in centrifuge 29 may not be perfect, particularly if no water from the wash liquor is permitted to enter the gluten overflow, or if a downflow is provided through the separation zone. Further purification between the starch and the gluten is effected in the centrifuge 36, which is fed with starch from line 33 after being diluted by a portion of the gluten overflow, as indicated by line 66. It is often preferable to operate centrifuge 36 so that a material part of the water from the wash liquor introduced into the same discharges together with the gluten in the overflow 61. In other words, a flow of wash water is provided through the zone of separation, countercurrent to the movement of the starch particles. After being purified in the centrifuge 36, the starch is dewatered and further washed in filters 59 and 72.

Both the overflow and the underflow from the centrifuges will be foamed to a material degree, due to the beating in of air during centrifugal separation. Therefore, the elaborations afforded by the flotation cells can be utilized, if desired, to aid in securing a thickened gluten for the presses 42, and in order to aid in securing a proper separation between the starch and the gluten, and to afford a high quality starch containing a minimum of impurities.

It is evident that the process as described with respect to Fig. 1 has many desirable characteristics which are not found in present conventional processes or systems for the manufacture of corn starch. The water, which in conventional systems is removed in gluten settlers, is removed largely by the filter 25, and the subsequent separation between the starch and the gluten is carried out in such a manner that a high gravity gluten is obtained which can be delivered directly to the presses. The amount of fresh water required for the system is held to a minimum, and is utilized effectively to carry out the different operations and to effect proper purification of the starch. The utilization of wash liquor as indicated will not cause fouling of the system, as is frequently the case where it is attempted to return liquid drawn from gluten settlers back into the process. Return of gluten overflow does not cause bacteriological fouling, because of the relatively short period of time during which such returned gluten is in contact with the starch. A starch of high quality and purity is obtained, which contains a low percentage of protein. Even though one may not desire to omit the use of conventional gluten settlers or other gluten thickeners, the use of repulping as described to thicken the gluten overflow from centrifuge 29, is of material benefit because by such an arrangement the amount of water which must be removed from the gluten overflow, is reduced. As previously pointed out water removed from the gluten overflow tends to be contaminated, and therefore any material reduction in the amount of such water is beneficial, and simplifies the problem of utilizing or disposing of the same.

It is apparent that the process of Fig. 1 is capable of a variety of modifications. For example, more than two centrifuges may be utilized, so that the first centrifuge can be operated with a downflow of gluten, to afford increased thickening of the gluten overflow. I also contemplate the use of separating means other than the type disclosed in said Patents Nos. 1,923,454 and 1,945,786, as for example a continuous centrifuge having no return of underflow material, but having provision for introducing wash liquor into the centrifuge rotor near the periphery thereof.

I claim:
1. In a method of separation, effecting separation between suspended solid components of a liquid feed material whereby lighter solid components are removed in an overflow and heavier solid components are removed in an underflow, and making up the feed by pulping material containing said components with a part of said overflow, the material before being pulped containing an insufficient amount of carrier liquid for directly supplying the same to the separating step.

2. In a method of treating liquid materials containing lighter and heavier solid components suspended in a carrier liquid, effecting removal of a substantial amount of the carrier liquid, then diluting the remainder of the material with a liquid material containing only the lighter components, subjecting the diluted material to separating forces to effect a separation between lighter and heavier solid components, the lighter components being delivered in an overflow and the heavier components being delivered in an underflow, and utilizing a part of the overflow as the diluting medium in the second-mentioned step.

3. In a wet starch manufacturing process, where corn or like starch bearing material is subjected to steeping and milling operations to produce a liquor containing starch and gluten, the improvement consisting in dewatering the liquor, pulping the dewatered material with a liquid medium, and then subjecting the resulting material to centrifugal separation whereby the gluten is removed in an overflow and the starch in an underflow, a part of the gluten overflow being utilized to provide said liquid medium for pulping said dewatered material.

4. In a wet starch manufacturing process, where corn or like starch bearing material is subjected to steeping and milling operations to produce a mill starch containing starch and gluten, the improvement consisting in dewatering the mill starch, mixing the dewatered material with a liquid medium, subjecting the resulting mixture to centrifugal separation whereby gluten is removed in an overflow and starch in an underflow, and continually supplying an additional wash liquor to the centrifugal separating operation whereby the liquid contained in the underflow consists mainly of liquid from the wash, a part of the gluten overflow being utilized to provide said liquid medium for mixing with said dewatered material.

5. In a wet starch manufacturing process, where corn or like starch bearing material is subjected to steeping and milling operations to produce a mill starch containing starch and gluten, the improvement consisting in dewatering the mill starch, mixing the dewatered material with a gluten containing liquor, subjecting the mixture to a primary separating operation whereby gluten is removed in an overflow and the starch in an underflow, maintaining the overflow in thickened condition by utilizing a part of the gluten overflow as said gluten containing liquor for mixing with the dewatered material, and delivering another part of the thickened gluten overflow directly to gluten filters or presses without further dewatering or thickening.

6. In a wet starch manufacturing process, where corn or like starch bearing material is subjected to steeping and milling operations to produce a mill starch containing starch and gluten, the improvement consisting in filtering the mill starch, pulping the filter cake with gluten containing liquor, subjecting the resulting pulped material to centrifugal separation whereby gluten is removed in an overflow and starch in an underflow, utilizing a part of the gluten overflow to form said gluten containing liquor for pulping the filter cake, supplying wash water to the step of centrifugal separation whereby the liquid in the underflow consists mainly of wash water, and delivering another part of the overflow directly to gluten filters or presses.

7. In a method of treating liquid feed materials containing lighter and heavier solid components, the steps of effecting removal of carrier liquid from the feed material to form substantially a caked mass, pulping the caked mass with a liquid medium, and then subjecting the material to centrifugal separation whereby lighter components are removed in an overflow and heavier components are removed in an underflow, a part of said overflow being continuously diverted and utilized as said liquid medium.

8. In a method of separation, effecting separation between suspended solid components of a liquid feed material, whereby lighter solid components are removed in an overflow and heavier solid components are removed in an underflow, making up the feed by directly by-passing a part of the overflow and pulping a mass of material containing said components with the same, thereby forming said liquid feed material, and supplying wash liquor to the separating operation whereby the liquid in the underflow consists mainly of said wash liquor, the mass of material being pulped containing of itself an amount of carrier liquid, which is sufficient to form substantially the entire liquid content of the overflow, but which is insufficient in amount to enable the material to be directly applied to the separating step without pulping.

9. In a wet starch manufacturing process, where corn or like starch-bearing material is subjected to steeping and milling operations to produce a mill starch containing starch and gluten, the improvement comprising reducing the water content of mill starch to form a material of such gravity that it can not be effectively subjected to centrifugal separation, adding liquid to such material to make up a material of substantially lower gravity, subjecting the last-named material to centrifugal separation whereby starch is removed in an underflow and gluten is removed in an overflow, and using a part of the gluten overflow as liquid to decrease the gravity of the first named material, whereby a substantial part of the water content of the material being subjected to separation, is supplied by water from the gluten overflow.

ALBERT PELTZER.